R. A. GIBBS.
HEADLIGHT FOR VEHICLES.
APPLICATION FILED MAY 22, 1920.

1,415,236.

Patented May 9, 1922.

Inventor
Ralph A. Gibbs
By
Attorney

UNITED STATES PATENT OFFICE.

RALPH A. GIBBS, OF PHILADELPHIA, PENNSYLVANIA, ASSIGNOR TO LOUIS J. KOLB, TRADING AS SAFETEE GLASS COMPANY, OF PHILADELPHIA, PENNSYLVANIA.

HEADLIGHT FOR VEHICLES.

1,415,236.

Specification of Letters Patent. Patented May 9, 1922.

Application filed May 22, 1920. Serial No. 383,337.

*To all whom it may concern:*

Be it known that I, RALPH A. GIBBS, a citizen of the United States, and resident of Philadelphia, county of Philadelphia, and State of Pennsylvania, have invented an Improvement in Headlights for Vehicles, of which the following is a specification.

The object of my invention is to provide an improved head light for automobiles and more particularly the lens thereof, whereby the light emitted may be properly delivered to the roadway in front of the vehicle to fulfill the legal requirements and at the same time having the lens so constructed that it shall be strong and durable, inexpensive and non-breakable to the extent of exposing the interior of the headlight to the outside atmosphere.

My invention comprehends the special construction of the lens of a headlight in which the lens is constructed of laminated glass made up of two sheets of glass with an interposed sheet of pyralin, or its equivalent, firmly welded or otherwise secured between and united to the said glass sheets, so as to form with them a unitary structure; and said pyralin sheet so formed that approximately one-half of the area of the lens is transparent to light and the other half more or less opaque and preferably colored, so or less opaque and preferably colored, so that it is sufficiently translucent to obstruct the greater portion of the light rays, whereby the light emitted from the upper portion of the lens is more or less subdued in intensity and illuminates the space immediately above the automobile but checks the glare which would be transmitted down the roadway in front of the automobile above a definite level from the roadway.

With the above and other objects in view, the nature of which will be more fully understood from the description hereinafter, the invention consists in the novel construction of head light and lens therefor, as hereinafter more fully described and defined in the claim.

Figure 1:
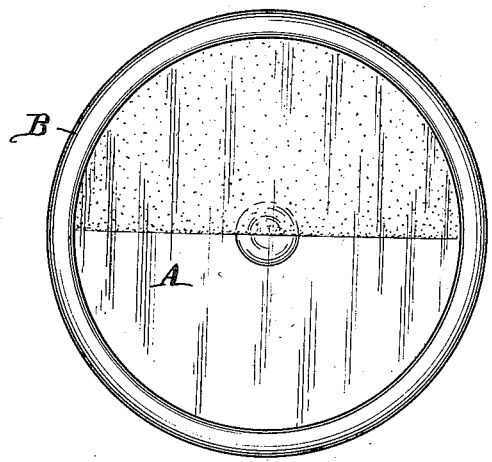
Figure 2:
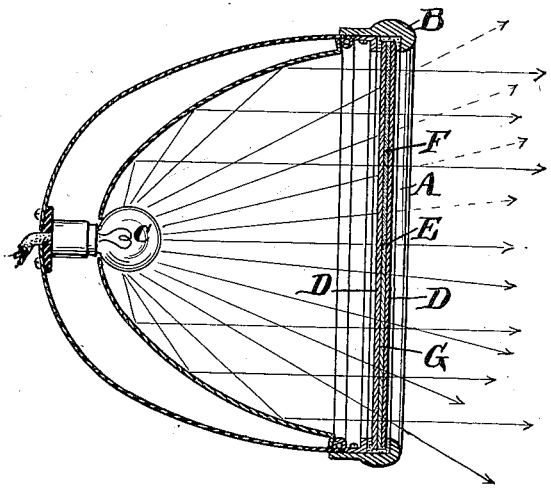
Figure 3:
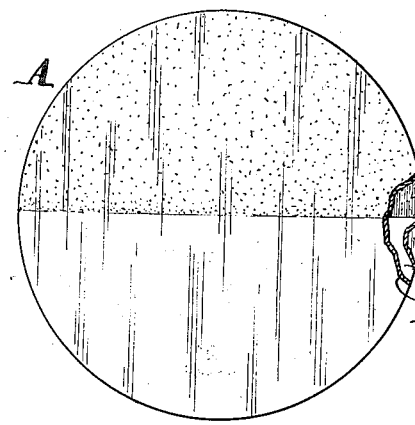

Referring to the drawing: Fig. 1 is a front elevation illustrating a head light embodying my improvements; Fig. 2 is a vertical section through the lens and showing association with the lamp of the head light; and Fig. 3 is an elevation of the pyralin sheet before being welded or secured to the sheets of glass.

A is the lens and B the metallic body of the head light and in which the lens is secured with a definite relation to the electric or other light C forming a part of the headlight. The general construction of the body or casing of the headlight may be varied in general design or general configuration to suit the manufacturer and may be provided with a suitable reflecting surface of any customary form. My improved lens A comprises two circular sheets of clear glass D, D, secured together by means of a sheet of pyralin or celluloid compound E which is also circular and of the diameter of the glass sheets D, D. The pyralin sheet E is shown in elevation in Fig. 3 and comprises the semi-circular portions F and G, the former being in practice of a translucent form preferably due to green coloring matter and the latter formed of clear transparent pyralin suitable for the free passage of the light rays. This compound sheet of pyralin E may be shaved from the end of a block of pyralin having longitudinal green and transparent portions physically united to constitute the diameter in the finished article, the sheet E being shaved from the block. Instead of forming this composite sheet in said manner, it may be formed by employing a sheet F of green pyroxylin and a sheet G of transparent pyroxylin, the abutting edges of which are trimmed perfectly straight, abutted and cemented together into a unitary sheet by a pyroxylin cement. This composite pyroxlin sheet after being properly formed with the translucent and transparent portions, is then united to the two outside layers of glass by any of the well known processes comprising the welding of the pyroxylin to the glass by removal of the air application of the pressure and heat.

I have referred to the interposed layer as being of pyralin, but I do not limit myself to this particular kind of pyroxylin, as any of the pyroxylin compounds, such as celluloid, fiberloid, viscoloid, xylonite and others of these compounds found on the market may be employed and included under my invention. While I prefer that these compounds shall be directly welded to the glass by heat and pressure, I do not so restrict myself, as they may be cemented in place by first dipping them in acetone or other solvent to soften the surface and then subjecting the combined glass and pyroxylin sheet to pressure. Broadly considered, my invention comprehends the special lens when comprised of two glass sheets united by a binding sheet which provides a semi-circular transparent layer and a semi-circular translucent layer and which, should the glass become cracked, will hold the cracked layers of glass against flying apart and exposing the interior of the headlight and electric bulb to the outside atmosphere as well as the danger of flying pebbles finding their way to and crushing the electric bulb. It will be understood that my improved lens not only properly controls the distribution of the light, but is effective in case of being cracked, to protect and shield the interior of the headlight until the lens can be substituted by a fresh lens. Even though cracked, the lens will perform its function in a fully effective manner.

While in practice my improved lenses have the upper semi-circular portions formed of a opal color and which color is well suited to the purpose, nevertheless, I do not restrict myself to any particular color, as the especial function of the semi-opaqueness of the upper portion of the lens is to prevent the glare from the light rising above a given level at a distance, so that approaching persons or automobilists will not be blinded or confused in making out the vehicle from which the light is projected, and it therefore, follows that the material constituting the part F of the interposed layer may be of any color or any composition, so long as it permits a reasonable amount of light for immediate surroundings where a diffused light will suffice, but which shall prevent the full glare from the upper portion of the lens.

In practice, I form the interposed layer E of a continuous sheet because under such conditions there is no direction of a line of fracture which could possibly sever the entire lens, but in a broader understanding of my invention, the two parts F, G, of the interposed layer E may be formed of two semi-circular sheets of pyroxylin or other compound and firmly united to the outer glass sheets.

The fact that my improved lens is non-shatterable into flying parts, insures protection to the silver reflectors and bulbs constituting the greater portion of the value of the whole head light. A severe blow upon the lens may crack it into hairy lines radiating in all directions but the article in its entirety will still remain intact in the head light body, thereby avoiding the scratching of the reflector surface with broken glass and preventing inflow of rain and refuse which so frequently takes place with one piece glass lenses when they become broken. Furthermore, even though cracked, my improved lens holds together and performs its function as a lens with effectiveness, whereas with the usual forms of lenses employing a single piece of glass, the breaking of the lens means the destruction of its special properties.

More generically considered, my lens may be formed by a union of two sheets of glass with an interposed layer providing a translucent upper portion, the lower portion being tansparent; and in effecting this, the interposed layer may be of other materials than pyroxylin compound, such as silk, linen, cotton, paper and parchment, which may be cemented or otherwise made to adhere to the glass. These substances may be cemented to both glass sheets, or if desired, to the one sheet and preferably that one which comes next to the lamp and the other sheet held in close contact relation. When layers of these materials are employed, that portion which covers one-half the glass is rendered translucent by treatment with celluloid or other pyroxylin; or with a gelatine or other equivalent compound where the layer is not of itself sufficiently translucent; thus parchment may be treated with a varnish or pyroxylin solution which will also insure its adherence to the glass.

In a head light lens of this character, not only is it efficient in permitting a maximum passage of luminous rays while preventing the objectionable glare through the upper half of the lens, but the lens itself if cracked will not fly apart and consequently affords protection to the lamp bulb and the silvered reflecting surface of the head light, this being a point of importance as the bulb and reflector constitute usually over half the value of the head light. Furthermore, my improved lens presents no projections or irregular outer surfaces to collect dirt and dust or to provide weakened parts capable of facilitating cracking. The lens being preferably smooth, it is easily cleaned and will remain clean for a longer period than most lenses in general use.

It will now be apparent that I have devised a novel and useful construction which embodies the features of advantage enumerated as desirable, and while I have in the present instance shown and described the preferred embodiment thereof which has been found in pactice to give satisfactory and reliable results, it is to be understood that I do not restrict myself to the details, as the same are susceptible of modification in various particulars, without departing from the spirit or scope of the invention,

Having now described my invention, what I claim as new and desire to secure by Letters Patent, is:

A head light lens through which the light is caused to pass, comprising two sheets of glass having smooth adjacent surfaces and respectively secured firmly upon opposite sides of a sheet of pyroxylin, said sheet of pyroxylin having approximately one-half of its mass of transparent character and the other half of translucent character, and in which the juncture of the transparent and translucent portions forms a substantially straight line adapted to be arranged horizontally in use.

In testimony of which invention, I hereunto set my hand.

RALPH A. GIBBS.